(12) United States Patent
Chang

(10) Patent No.: US 6,950,158 B2
(45) Date of Patent: Sep. 27, 2005

(54) TRANSFLECTIVE LIQUID CRYSTAL DISPLAY DEVICE AND FABRICATION METHOD THEREOF

(75) Inventor: Ching Chao Chang, Taipei (TW)

(73) Assignee: Hannstar Display Corp., Taipei (TW)

( * ) Notice: Subject to any disclaimer, the term of this patent is extended or adjusted under 35 U.S.C. 154(b) by 38 days.

(21) Appl. No.: 10/787,484

(22) Filed: Feb. 26, 2004

(65) Prior Publication Data

US 2005/0001959 A1 Jan. 6, 2005

(30) Foreign Application Priority Data

May 12, 2003  (TW) .......................................... 92112785 A

(51) Int. Cl.⁷ ...................... G02F 1/1335; G02F 1/1337
(52) U.S. Cl. ........................ 349/114; 349/129; 349/130
(58) Field of Search ................................ 349/114, 129, 349/130

(56) References Cited

U.S. PATENT DOCUMENTS

2004/0212763 A1 * 10/2004 Tsuchiya .................... 349/114

* cited by examiner

Primary Examiner—James A. Dudek
(74) Attorney, Agent, or Firm—Thomas, Kayden, Horstemeyer & Risley

(57) ABSTRACT

A transflective LCD device with a single cell gap. First and second pixel electrodes are formed on the lower substrate. First and second common electrodes are formed on an inner surface of the upper substrate. The first pixel electrodes and the first common electrodes are located in the reflective region. The second pixel electrodes and the second common electrodes are located in the transmissive region. A first orientation control window having a slit width "$S_{rc}$" is formed between the first common electrodes in an area corresponding to each first pixel electrode. A second orientation control window having a slit width "$S_{tc}$" is formed between the second common electrodes, satisfying $S_{rc} < S_{tc}$. The second orientation control window is in an area corresponding to each second pixel electrode. Accordingly, maximum light efficiency can be achieved in both reflective and transmissive modes.

44 Claims, 6 Drawing Sheets

TRANSFLECTIVE LIQUID CRYSTAL DISPLAY DEVICE AND FABRICATION METHOD THEREOF

BACKGROUND OF THE INVENTION

1. Field of the Invention

The present invention relates to a vertically aligned (VA) transflective liquid crystal display device, and more particularly, to a VA transflective liquid crystal display device with a single cell gap.

2. Description of the Related Art

Liquid crystal display (LCD) devices are widely used for portable televisions, notebook computers and other applications. Liquid crystal display devices are classified into transmissive devices using a backlight as a light source, and reflective devices using an external light source, such as sunlight or indoor lamp. It is difficult to conserve weight, volume, and power consumption of transmissive LCDs due to the power requirements of the backlight component. Reflective LCDs have the advantage of no backlight component, but cannot operate without an external light source.

An alternative to these types of LCDs is a transflective LCD device which can operate both reflectively and transmissively. Transflective LCD devices have a reflective electrode in a pixel region, wherein the reflective electrode has a transmissive portion. Thus, the transflective LCD device features lower power consumption than conventional transmissive LCD devices because no backlight component used when there is a bright external light. Further, the transflective LCD device has the advantage of operating as a transmissive LCD, using a backlight when required.

FIG. 1 is an exploded perspective view of a typical transflective LCD device. The transflective LCD device comprises upper and lower substrates 10 and 20 opposed to each other, and an interposed liquid crystal layer 50 therebetween. The upper substrate 10 acts as a color filter substrate and the lower substrate 20 an array substrate. In the upper substrate 10, black matrix 12 and color filter layer 14 including a plurality of red (R), green (G) and blue (B) color filters are formed. That is, the black matrix 12 surrounds each color filter, in the shape of an array matrix. Also on the upper substrate 10, a common electrode 16 is formed to cover the color filter layer 14 and the black matrix 12.

In the lower substrate 20, a TFT "T" acting as a switching device, is formed in the shape of an array matrix corresponding to the color filter layer 14. In addition, a plurality of crossing gate and data lines 26 and 28 are positioned such that each TFT is located near each intersection of the gate and data lines 26 and 28. Further on the lower substrate 20, a plurality of pixel regions (P) are defined by the gate and data lines 26 and 28. Each pixel region P has a pixel electrode 22 comprising a transparent portion 22a and an opaque portion 22b. The transparent portion 22a comprises a transparent conductive material, such as ITO (indium tin oxide) or IZO (indium zinc oxide), and the opaque portion 22b comprises a metal having high reflectivity, such as Al (aluminum) or Ag (silver).

FIG. 2, a sectional view of a conventional transflective LCD device, illustrates the operation thereof. As shown in FIG. 2, the conventional transflective LCD device comprises a lower substrate 200, an upper substrate 260 and an interposed liquid crystal layer 230. The upper substrate 260 comprises a common electrode 240 and a color filter 250 formed thereon. The lower substrate 200 comprises an insulating layer 210 and a pixel electrode 220 formed thereon, wherein the pixel electrode 220 comprises an opaque portion 222 and a transparent portion 224. The opaque portion 222 of the pixel electrode 220 can be an aluminum layer, and the transparent portion 224 of the pixel electrode 220 can be an ITO (indium tin oxide) layer. The opaque portion 222 reflects ambient light 270, while the transparent portion 224 transmits light 280 from a backlight device (not shown) disposed on the exterior of the lower substrate 200. Also, there is a drop between the opaque portion 222 and the transparent portion 224. The liquid crystal layer 230 is interposed between the lower and upper substrates 200 and 260. In FIG. 2, the liquid crystal layer 230 comprises dual cell. gaps. Generally, the material of the liquid crystal layer 230 comprises a twisted nematic (TN) type liquid crystal. Thus, the transflective LCD device is operable in both reflective and transmissive modes.

In U.S. Pat. No. 5,136,407, Clerc discloses avertically aligned LCD device. The LCD device has two groups of mutually crossing parallel electrodes sandwiching a liquid crystal layer, wherein the electrodes of one group comprise an aperture at each electrode intersection along the direction of and centrally at the electrode of the other group. The electric field at the aperture portion is constantly angled to a predetermined direction to present uniformly wide stable display areas. This method is usually applied to widen the viewing angle of the LCD, featuring slits separated by the same distance and utilizing liquid crystal molecules with negative dielectric anisotropy.

The conventional structure of slits between electrodes, nevertheless, is not presently applied to the transflective LCD device. Moreover, when the transflective LCD device uses the conventional method with equal spacing between slits, display brightness differs dramatically between the transmissive region and the reflective region. That is, the conventional configuration cannot achieve maximum light efficiency in both transmissive and reflective modes in the transflective LCD device.

SUMMARY OF THE INVENTION

One object of the present invention is to provide a transflective liquid crystal display device with a single cell gap, providing maximum light efficiency in both transmissive and reflective modes.

Yet another object of the present invention is to provide a method of forming an integrated color filter having various thicknesses on an array substrate, which causes requisite color purity in both transmissive and reflective mode.

In order to achieve these objects, the present invention provides a transflective liquid crystal display device with a single cell gap, wherein the transflective LCD device comprises a reflective region and a transmissive region. A first substrate and a second substrate opposite thereto are provided. A plurality of first pixel electrodes and a plurality of second pixel electrodes are formed overlying the first substrate, the first pixel electrodes located in the reflective region and the second pixel electrodes in the transmissive region. A plurality of first common electrodes and a plurality of second common electrodes are formed on an inner surface of the second substrate, the first common electrodes located in the reflective region and the second common electrodes in the transmissive region. A vertically aligned liquid crystal layer is interposed between the first substrate and the second substrate, wherein orientation of the vertically aligned liquid crystal layer is controlled by an electric field between the pixel electrodes and the common electrodes. A first orientation control window having a slit width "$S_{rc}$" is formed between the first common electrodes in an area corresponding to each first pixel electrode and divides the liquid crystal layer into a plurality of orientation sections. A second orientation control window having a slit width "$S_{tc}$" is formed between the second common electrodes in an area corresponding to each second pixel electrode and divides the liquid crystal layer into a plurality of orientation sections. A relationship between $S_{rc}$ and $S_{tc}$ satisfies $S_{rc}<S_{tc}$.

In order to achieve these objects, the present invention also provides a method of manufacturing a transflective liquid crystal display device with a single cell gap, wherein the transflective LCD device comprises a reflective region and a transmissive region. A first substrate and a second substrate opposite thereto are provided. A reflective layer is formed on the first substrate in the reflective region. A transparent planarization layer or a color filter is formed overlying the reflective layer and the first substrate. A plurality of first pixel electrodes and a plurality of second pixel electrodes are formed overlying the transparent planarization layer or the color filter, wherein the first pixel electrodes are located in the reflective region and the second pixel electrodes in the transmissive region. A plurality of first common electrodes and a plurality of second common electrodes are formed on an inner surface of the second substrate, wherein the first common electrodes are located in the reflective region and the second common electrodes are located in the transmissive region. Liquid crystal molecules fill a space between the first substrate and the second substrate to form a vertically aligned liquid crystal layer, wherein orientation of the vertically aligned liquid crystal layer is controlled by an electric field between the pixel electrodes and the common electrodes. A first orientation control window having a slit width "$S_{rc}$" is formed between the first common electrodes in an area corresponding to each first pixel electrode and divides the vertically aligned liquid crystal layer into a plurality of orientation sections. A second orientation control window having a slit width "$S_{tc}$" is formed between the second common electrodes in an area corresponding to each second pixel electrode and divides the vertically aligned liquid crystal layer into a plurality of orientation sections. A relationship between $S_{rc}$ and $S_{tc}$ satisfies $S_{rc}<S_{tc}$.

The present invention improves on the conventional technology in that the first orientation control window having a slit width "$S_{rc}$" is formed between the first common electrodes in an area corresponding to each first pixel electrode. The second orientation control window having a slit width "$S_{tc}$" is formed between the second common electrodes in an area corresponding to each second pixel electrode. Specially, a relationship between "$S_{rc}$" and "$S_{tc}$" satisfies $S_{rc}<S_{tc}$. According to the present invention, the effective birefringence ($\Delta n_{eff}$) in the reflective region can be different from that in the transmissive region, thereby achieving maximum light efficiency in both reflective and transmissive modes under saturation voltage and ameliorating the disadvantages of the conventional technology.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
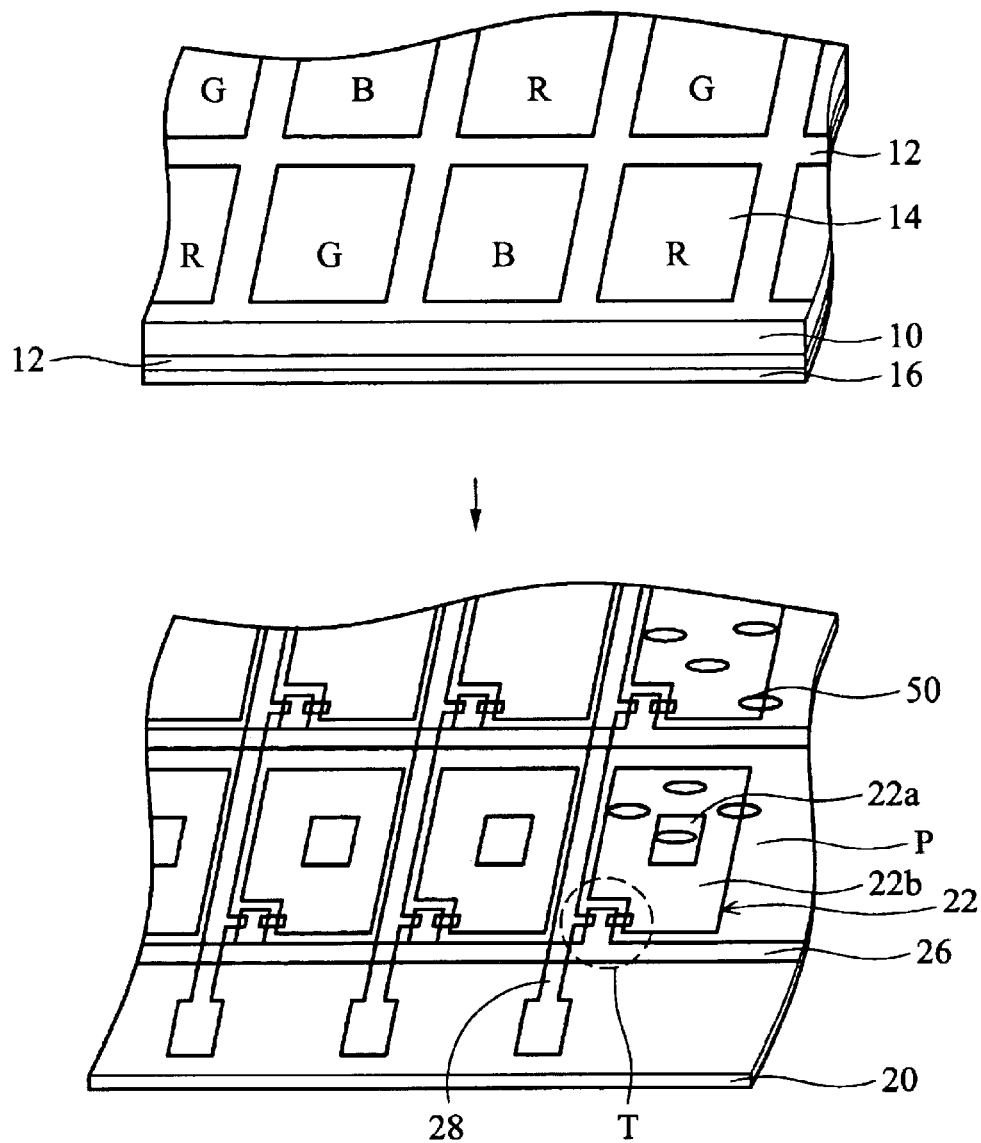
FIG. 1 is an exploded perspective view of a typical transflective LCD device.
Figure 2:
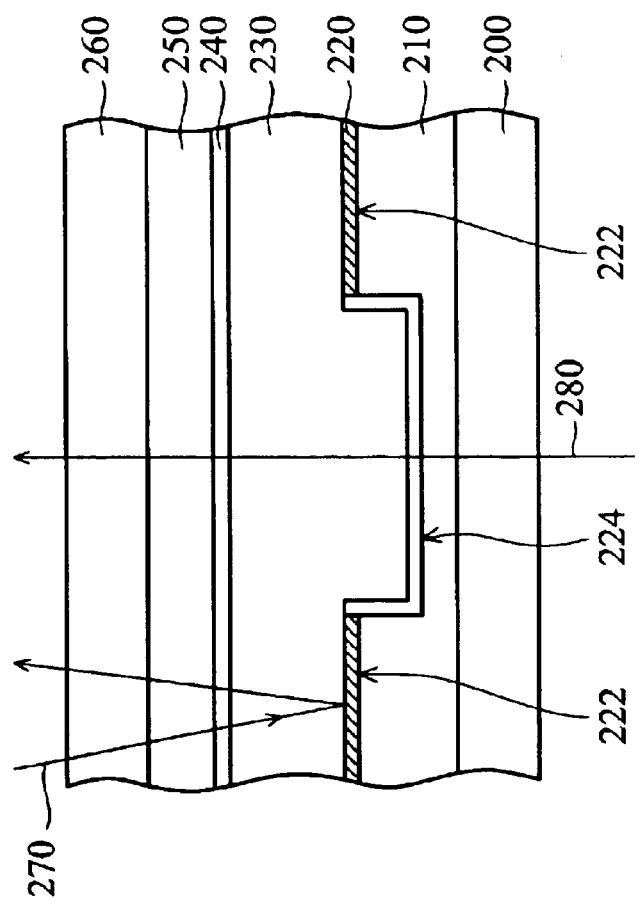
FIG. 2 is a sectional view of a transflective LCD device according to the conventional technology, illustrating the operation thereof.

Reference will now be made in detail to the present preferred embodiments of the invention, examples of which are illustrated in the accompanying drawings. Wherever possible, the same reference numbers are used in the drawings and the description to refer to the same or like parts.

Figure 3:
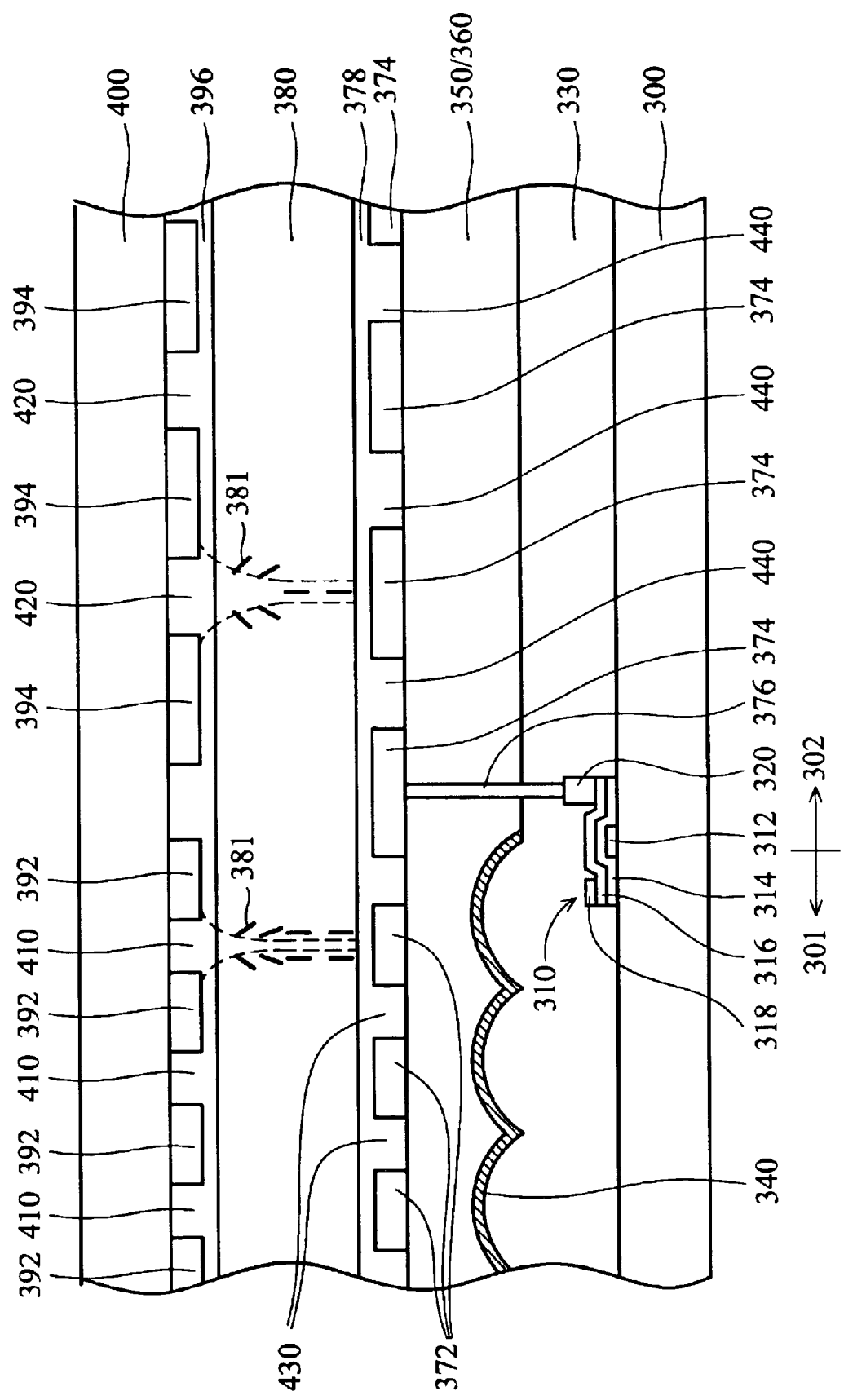
FIG. 3 is a sectional view of a transflective LCD device with a single cell gap according to the present invention.

FIG. 3 is a sectional view of a transflective LCD device with a single cell gap according to the present invention. In order to simplify the illustration, FIG. 3 shows a substrate in a single pixel region, although pixel regions may be numerous.

A first substrate 300 serving as a lower substrate comprises a predetermined reflective region (or section) 301 and a predetermined transmissive region (or section) 302. The first substrate 300 may be a heat-resistant glass substrate.

A pixel driving device array overlies the first substrate 300. The pixel driving device array may be a thin film transistor (TFT) 310 array. The TFT device 310 comprises a gate 312, a gate insulating layer 314, a semiconductor layer 316, a source electrode 318 and a drain electrode 320. The source electrode 318 and the drain electrode 320 are interchangeable.

An insulating layer 330 blanketly overlies the first substrate 300 to cover the TFT 310 array. An exemplary method of forming the insulating layer 330 follows. A photosensitive resin layer is coated over the first substrate 300. A UV photolithography procedure using a photomask is performed. A partial development and a curing treatment are then performed to form the insulating layer 330. The surface of the insulating layer 330 can be smooth or uneven in the reflective region 301, preferably, uneven. The surface of the insulating layer 330 is smooth in the transmissive region 302. It should be noted that the top surface of the insulating layer 330 in the reflective region 301 is higher than that in the transmissive region 302.

A conformal reflective layer 340 overlies the insulating layer 330 in the reflective region 301. The reflective layer 340 can be an aluminum or silver layer formed by deposition and partial etching.

A transparent planarization layer 350 (also referred to as a passivation layer) or a layer of color filter 360 overlies the reflective layer 340 and the insulating layer 330. The transparent planarization layer 350 can be a $SiO_2$ or SOG (spin-on-glass) layer formed by deposition or coating. The color filter 360 can comprise a red (R) region, a green (G) region and a blue (B) region, which can be formed by pigment dispersion, inkjet, or other processes. It should be noted that, since the color filter 360 in the reflective region 301 is thinner than in the transmissive region 302, the total route length of ambient light (or reflective light, not shown) passing through the color filter 360 in the reflective region 301 is similar to that of the backlight (not shown) penetrating the color filter 360 in the transmissive region 302. That is, the total route length of the backlight and the ambient light passing through the color filter 360 are approximate, thereby improving color reproduction (color purity) between the reflective and transmissive modes. In order to simplify the illustration, the color filter 360 is represented hereinafter.

A plurality of first pixel electrodes 372 and a plurality of second pixel electrodes 374 are disposed on the color filter 360. The first pixel electrodes 372 are located in the reflective region 301 and the second pixel electrodes 374 in the transmissive region 302. The pixel electrodes 372 and 374 can be ITO (indium tin oxide) or IZO (indium zinc oxide) layers formed by deposition and partial etching. The thickness of each pixel electrode 372/374 is about 500 Å. Additionally, the pixel electrodes 372 and 374 electrically connect the TFT device 310 by means of a conductive plug 376. Then, an alignment film 378 can overlie the pixel electrodes 372 and 374. It is not necessary to perform a rubbing treatment on the alignment film 378.

A second substrate 400 serving as an upper substrate is opposite the first substrate 300. The second substrate 400 may be a glass substrate. A plurality of first common electrodes 392 and a plurality of second common electrodes 394 are disposed on an inner surface of the second substrate 400. The first common electrodes 392 are located in the reflective region 301 and the second common electrodes 394 in the transmissive region 302. The common electrodes 392 and 394 can be ITO (indium tin oxide) or IZO (indium zinc oxide) layers formed by deposition and partial etching. The thickness of each common electrode 392/394 is about 500 Å. Additionally, an alignment film 396 can overlie the common electrodes 392 and 394. It is not necessary to perform a rubbing treatment on the alignment film 396.

Negative type ($\Delta\epsilon<0$) liquid crystal molecules 381 fill a space between the first and second substrates 300 and 400 to form a vertically aligned (VA) type liquid crystal layer 380. The orientation of the vertically aligned liquid crystal layer 380 is controlled by an electric field (shown by dotted lines) between the pixel electrodes 372, 374 and the common electrodes 392, 394. It should be noted that there is a single gap "d", referring to FIG. 4, between the pixel electrodes 372, 374 and the common electrodes 392, 394. That is, the thickness of the liquid crystal layer 380 is uniformed. For example, the gap "d" ranges from 3 to 5 $\mu$m.

Moreover, at least one compensation film (not shown) and polarizer (not shown) can be disposed on exterior sides of the substrates 300 and 400.

Figure 4:
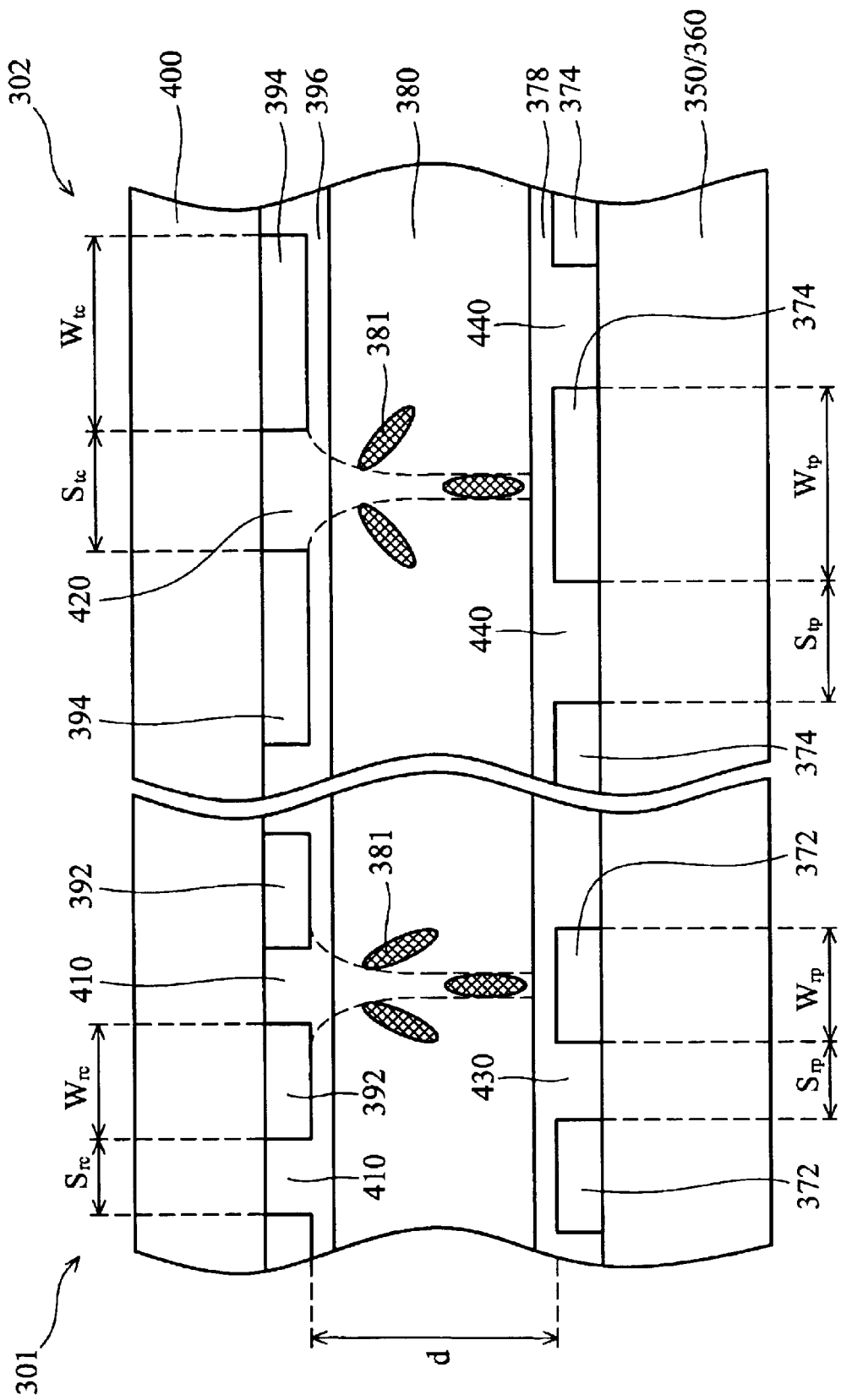
FIG. 4 is an explanatory diagram showing the tilt angles of liquid crystal molecules and the configuration of the present invention.

FIG. 4 is an enlarged diagram of a portion of the transflective LCD device, illustrating features of the present invention.

A first orientation control window 410 having a slit width "$S_{rc}$" is formed between the first common electrodes 392 in an area corresponding to each first pixel electrode 372 and divides the vertically aligned liquid crystal layer 380 into a plurality of orientation sections. A second orientation control window 420 having a slit width "$S_{tc}$" is formed between the second common electrodes 394 in an area corresponding to each second pixel electrode 374 and divides the vertically aligned liquid crystal layer 380 into a plurality of orientation sections. Specially, a relationship between $S_{rc}$ and $S_{tc}$ satisfies $S_{rc}<S_{tc}$.

Since the electric field applied to the liquid crystal molecules 381 located below the orientation windows 410 and 420 is not sufficiently strong to tilt these molecules 381, they have nearly vertical alignment (i.e. the tilt angle is very small). Around these molecules 381, however, an electric field is created as indicated by the dotted line in FIGS. 3 and 4, which controls the molecules 381 to direct their longer axes perpendicular to the applied field. Due to the fringe field effect, the tilt angle of the molecules 381 near the orientation windows 410 and 420 is larger.

Each first common electrode 392 has an electrode width "$W_{rc}$" and each second common electrode 394 an electrode width "$W_{tc}$". Specially, a relationship between $W_{rc}$ and $W_{tc}$ satisfies $W_{rc}<W_{tc}$.

In addition, a first opening 430 having a slit width "$S_{rp}$" is formed between the first pixel electrodes 372 in an area corresponding to each first common electrode 392. A second opening 440 having a slit width "$S_{tp}$" is formed between the second pixel electrodes 374 in an area corresponding to each second common electrode 394. Specially, a relationship between $S_{rp}$ and $S_{tp}$ satisfies $S_{rp}<S_{tp}$.

Each first pixel electrode 372 has an electrode width "$W_{rp}$" and each second pixel electrode 374 has an electrode width "$W_{tp}$". Specially, a relationship between $W_{rp}$ and $W_{tp}$ satisfies $W_{rp}<W_{tp}$.

It is preferred that, for symmetry, the first orientation control window 410 approximately faces a center part of each first pixel electrode 372, the second orientation control window 420 approximately faces a center part of each second pixel electrode 374, the first opening 430 approximately faces a center part of the first common electrode 392 and the second opening 440 approximately faces a center part of the second common electrode 394.

Size conditions of this preferred embodiment are illustrated, but are not intended to limit the present invention.

The slit width "$S_{rc}$" of the first orientation control window 410 ranges from 3 $\mu$m to 7 $\mu$m.

The slit width "$S_{tc}$" of the second orientation control window 420 ranges from 8 $\mu$m to 12 $\mu$m.

The electrode width "$W_{rc}$" of each first common electrode 392 ranges from 5 $\mu$m to 15 $\mu$m.

The electrode width "$W_{tc}$" of each second common electrode 394 ranges from 15 $\mu$m to 25 $\mu$m.

The slit width "$S_{rp}$" of the first opening 430 ranges from 3 $\mu$m to 7 $\mu$m.

The slit width "$S_{tp}$" of the second opening 440 ranges from 8 $\mu$m to 12 $\mu$m.

The electrode width "$W_{rp}$" of each first pixel electrode 372 ranges from 5 $\mu$m to 15 $\mu$m.

The electrode width "$W_{tp}$" of each second pixel electrode 374 ranges from 15 $\mu$m to 25 $\mu$m.

The gap "d" formed between the pixel electrodes 372/374 and the common electrodes 392/394 ranges from 3 $\mu$m to 5 $\mu$m.

It should be noted that, in this embodiment, $S_{rc}$ can equal $S_{rp}$, $S_{tc}$ can equal $S_{tp}$, Wrc can equal $W_{rp}$ and $W_{tc}$ can equal $W_{tp}$.

Figure 5A:
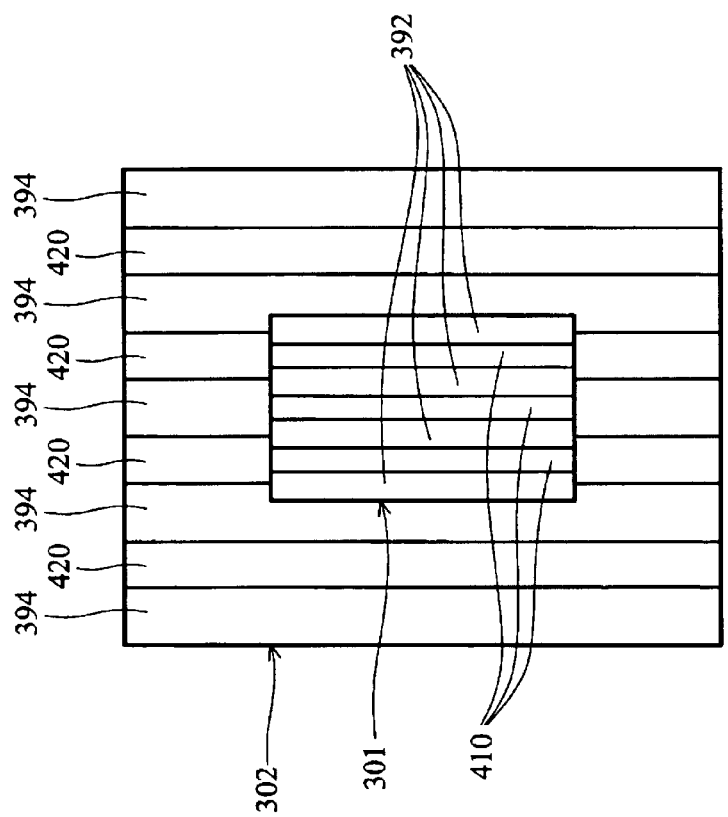
FIG. 5A is a plane view showing a layout example of the orientation control window of the present invention.
Figure 5B:
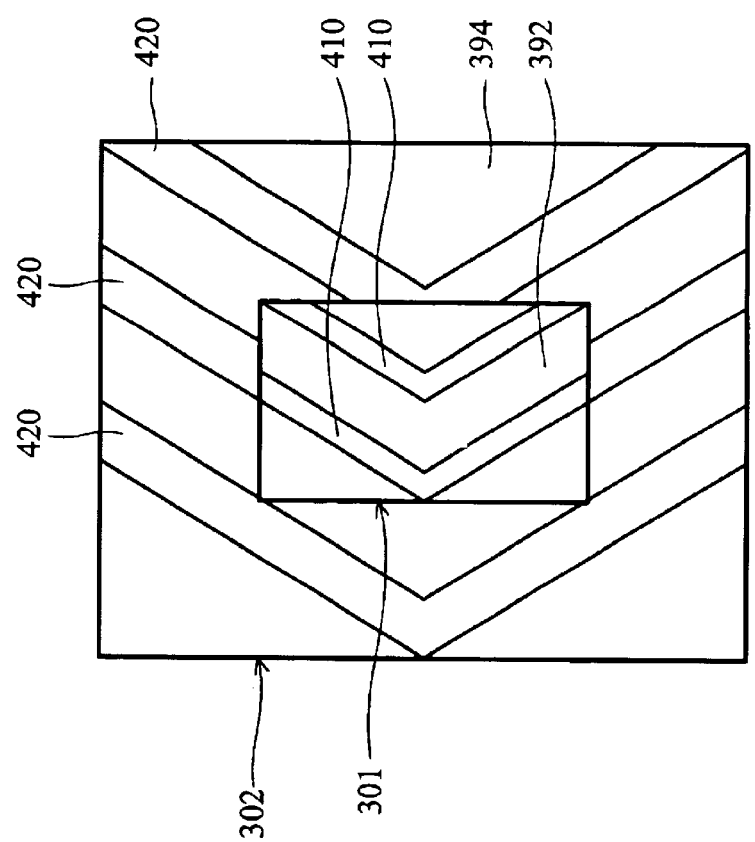
FIG. 5B is a plane view showing another layout example of the orientation control window of the present invention.

As regards the layout of the orientation windows 410 and 420, two layout examples are illustrated, but are not intended to limit the present invention. FIG. 5A shows a configuration of the first orientation control window 410 and the second orientation control window 420 is a straight striped pattern. FIG. 5B shows another configuration of the first orientation control window 410 and the second orientation control window 420 is a wedge-shaped (or an arrowhead) pattern.

Due to the slit width "$S_{rc}$" of the first orientation control window 410 being less than that "$S_{tc}$" of the second orientation control window 420, the directional variation of the fringe field near the first orientation control window 410 is smaller than that near the second orientation control window 420. Thus, the tilt angle of the molecules 381 near the first orientation control window 410 is smaller than that near the second orientation control window 420. This causes an effective birefringence ($\Delta n_{eff}$) in the reflective region 301 different from that in the transmissive region 302 (e.g. the effective birefringence in the transmissive region 302 ($\Delta n_{eff\text{-}t}$) is about twice than that in the reflective region 301 ($\Delta n_{eff\text{-}r}$)), thereby achieving maximum light efficiency in both reflective and transmissive modes under saturation voltage. That is, according to the present invention, the retardation under the reflective mode ($\Delta n_{eff\text{-}r}* 2d$) approximates that under the transmissive mode ($\Delta n_{eff\text{-}t}*d$), thereby achieving maximum display brightness in both modes under saturation voltage.

The present invention provides a transflective LCD device with a single cell gap, and fabrication method thereof. The first orientation control window having a slit width "$S_{rc}$" is formed between the first common electrodes, wherein the first orientation control window faces each first pixel electrode. The second orientation control window having a slit width "$S_{tc}$" is formed between the second common electrodes, wherein the second orientation control window faces each second pixel electrode. Specially, a relationship between "$S_{rc}$" and "$S_{tc}$" satisfies $S_{rc}<S_{tc}$. Thus, the tilt angle of the liquid crystal molecules is different in the reflective region and the transmissive region, thereby causing different effective birefringence therebetween. This invention creates an approximate retardation in both reflective and transmissive modes under saturation voltage, thereby achieving maximum light efficiency and ameliorating the disadvantages of the conventional technology.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display (LCD) device with a single cell gap, comprising:
    a first substrate and a second substrate opposite thereto, wherein the transflective LCD device comprises a reflective region and a transmissive region;
    a plurality of first pixel electrodes and a plurality of second pixel electrodes on the first substrate, the first pixel electrodes in the reflective region and the second pixel electrodes in the transmissive region;
    a plurality of first common electrodes and a plurality of second common electrodes on an inner surface of the second substrate, the first common electrodes in the reflective region and the second common electrodes in the transmissive region;
    a vertically aligned liquid crystal layer interposed between the first substrate and the second substrate, wherein orientation of the vertically aligned liquid crystal layer is controlled by an electric field between the pixel and common electrodes;
    a first orientation control window having a slit width "$S_{rc}$" between the first common electrodes in an area corresponding to each first pixel electrode and dividing the liquid crystal layer into a plurality of orientation sections; and
    a second orientation control window having a slit width "$S_{tc}$" between the second common electrodes in an area corresponding to each second pixel electrode and dividing the liquid crystal layer into a plurality of orientation sections;
    wherein a relationship between $S_{rc}$ and $S_{tc}$ satisfies $S_{rc}<S_{tc}$.

2. The transflective LCD device according to claim 1, wherein each first common electrode comprises an electrode width "$W_{rc}$" and each second common electrode comprises an electrode width "$W_{tc}$", and a relationship between $W_{rc}$ and $W_{tc}$ satisfies $W_{rc}<W_{tc}$.

3. The transflective LCD device according to claim 1, further comprising:
    a first opening having a slit width "$S_{rp}$" between the first pixel electrodes in an area corresponding to each first common electrode; and
    a second opening having a slit width "$S_{tp}$" between the second pixel electrodes in an area corresponding to each second common electrode;
    wherein a relationship between $S_{rp}$ and $S_{tp}$ satisfies $S_{rp}<S_{tp}$.

4. The transflective LCD device according to claim 2, wherein each first pixel electrode comprises an electrode width "$W_{rp}$" and each second pixel electrode comprises an electrode width "$W_{tp}$", and a relationship between $W_{rp}$ and $W_{tp}$ satisfies $W_{rp}<W_{tp}$.

5. The transflective LCD device according to claim 1, wherein the slit width "$S_{rc}$" of the first orientation control window ranges from 3 µm to 7 µm.

6. The transflective LCD device according to claim 1, wherein the slit width "$S_{tc}$" of the second orientation control window ranges from 8 µm to 12 µm.

7. The transflective LCD device according to claim 2, wherein the electrode width "$W_{rc}$" of each first common electrode ranges from 5 µm to 15 µm.

8. The transflective LCD device according to claim 2, wherein the electrode width "$W_{tc}$" of each second common electrode ranges from 15 µm to 25 µm.

9. The transflective LCD device according to claim 3, wherein the slit width "$S_{rp}$" of the first opening ranges from 3 µm to 7 µm.

10. The transflective LCD device according to claim 3, wherein the slit width "$S_{tp}$" of the second opening ranges from 8 µm to 12 µm.

11. The transflective LCD device according to claim 4, wherein the electrode width "$W_{rp}$" of each first pixel electrode ranges from 5 µm to 15 µm.

12. The transflective LCD device according to claim 4, wherein the electrode width "$W_{tp}$" of each second pixel electrode ranges from 15 µm to 25 µm.

13. The transflective LCD device according to claim 1, further comprising a gap "d" between the pixel and common electrodes, ranging from 3 µm to 5 µm.

14. The transflective LCD device according to claim 1, wherein configuration of the first orientation control window and the second orientation control window is a straight striped pattern.

15. The transflective LCD device according to claim 1, wherein configuration of the first orientation control window and the second orientation control window is a wedge-shaped pattern.

16. The transflective LCD device according to claim 1, further comprising:
    an insulating layer on the first substrate;
    a reflective layer on the insulating layer in the reflective region; and a transparent planarization layer on the reflective layer and the insulating layer;

wherein a top surface of the insulating layer in the reflective region is higher than that in the transmissive region.

17. The transflective LCD device according to claim 1, further comprising:

an insulating layer on the first substrate;

a reflective layer on the insulating layer in the reflective region; and a color filter on the reflective layer and the insulating layer;

wherein a top surface of the insulating layer in the reflective region is higher than that in the transmissive region.

18. The transflective LCD device according to claim 3, wherein $S_{rc}$ equals $S_{rp}$ and $S_{tc}$ equals $S_{tp}$.

19. The transflective LCD device according to claim 4, wherein $W_{rc}$ equals $W_{rp}$ and $W_{tc}$ equals $W_{tp}$.

20. The transflective LCD device according to claim 3, wherein the first orientation control window faces a center part of each first pixel electrode, the second orientation control window faces a center part of each second pixel electrode, the first opening faces a center part of the first common electrode and the second opening faces a center part of the second common electrode.

21. A method of fabricating a transflective liquid crystal display device, comprising the steps of:

providing a first substrate and a second substrate opposite thereto, wherein the transflective LCD device has a reflective region and a transmissive region;

forming a reflective layer overlying the first substrate in the reflective region;

forming a transparent planarization layer or a color filter overlying the reflective layer and the first substrate;

forming a plurality of first pixel electrodes and a plurality of second pixel electrodes on the transparent planarization layer or the color filter, wherein the first pixel electrodes are located in the reflective region and the second pixel electrodes in the transmissive region;

forming a plurality of first common electrodes and a plurality of second common electrodes on an inner surface of the second substrate, wherein the first common electrodes are located in the reflective region and the second common electrodes in the transmissive region; and filling a space between the first substrate and the second substrate with liquid crystal molecules to form a vertically aligned liquid crystal layer interposed between the first substrate and the second substrate, wherein orientation of the vertically aligned liquid crystal layer is controlled by an electric field between the pixel and common electrodes;

wherein a first orientation control window having a slit width "$S_{rc}$" is formed between the first common electrodes in an area corresponding to each first pixel electrode, dividing the vertically aligned liquid crystal layer into a plurality of orientation sections;

wherein a second orientation control window having a slit width "$S_{tc}$" is formed between the second common electrodes in an area corresponding to each second pixel electrode, dividing the vertically aligned liquid crystal layer into a plurality of orientation sections;

wherein a relationship between $S_{rc}$ and $S_{tc}$ satisfies $S_{rc}<S_{tc}$.

22. The method according to claim 21, wherein each first common electrode has an electrode width "$W_{rc}$" and each second common electrode an electrode width "$W_{tc}$", and a relationship between $W_{rc}$ and $W_{tc}$ satisfies $W_{rc}<W_{tc}$.

23. The method according to claim 21, further comprising the steps of:

forming a first opening having a slit width "$S_{rp}$" between the first pixel electrodes in an area corresponding to each first common electrode; and forming a second opening having a slit width "$S_{tp}$" between the second pixel electrodes in an area corresponding to each second common electrode;

wherein a relationship between $S_{rp}$ and $S_{tp}$ satisfies $S_{rp}<S_{tp}$.

24. The method according to claim 22, wherein each first pixel electrode has an electrode width "$W_{rp}$" and each second pixel electrode an electrode width "$W_{tp}$", and a relationship between $W_{rp}$ and $W_{tp}$ satisfies $W_{rp}<W_{tp}$.

25. The method according to claim 21, wherein the slit width "$S_{rc}$" of the first orientation control window ranges from 3 $\mu$m to 7 $\mu$m.

26. The method according to claim 21, wherein the slit width "$S_{tc}$" of the second orientation control window ranges from 8 $\mu$m to 12 $\mu$m.

27. The method according to claim 22, wherein the electrode width "$W_{rc}$" of each first common electrode ranges from 5 $\mu$m to 15 $\mu$m.

28. The method according to claim 22, wherein the electrode width "$W_{tc}$" of each second common electrode ranges from 15 $\mu$m to 25 $\mu$m.

29. The method according to claim 23, wherein the slit width "$S_{rp}$" of the first opening ranges from 3 $\mu$m to 7 $\mu$m.

30. The method according to claim 23, wherein the slit width "$S_{tp}$" of the second opening ranges from 8 $\mu$m to 12 $\mu$m.

31. The method according to claim 24, wherein the electrode width "$W_{rp}$" of each first pixel electrode ranges from 5 $\mu$m to 15 $\mu$m.

32. The method according to claim 24, wherein the electrode width "$W_{tp}$" of each second pixel electrode ranges from 15 $\mu$m to 25 $\mu$m.

33. The method according to claim 21, wherein a gap "d" is formed between the pixel and common electrodes, ranging from 3 $\mu$m to 5$\mu$m.

34. The method according to claim 21, wherein configuration of the first orientation control window and the second orientation control window is a straight striped pattern.

35. The method according to claim 21, wherein configuration of the first orientation control window and the second orientation control window is a wedge-shaped pattern.

36. The method according to claim 21, wherein the common electrodes are ITO (indium tin oxide) or IZO (indium zinc oxide) layers.

37. The method according to claim 21, wherein the pixel electrodes are ITO (indium tin oxide) or IZO (indium zinc oxide) layers.

38. The method according to claim 21, wherein the reflective layer is an aluminum or silver layer.

39. The method according to claim 21, wherein the transparent planarization layer is a $SiO_2$ layer.

40. The method according to claim 21, wherein the liquid crystal molecules are negative type ($\Delta\epsilon<0$).

41. The method according to claim 23, wherein $S_{rc}$ is equal to $S_{rp}$ and $S_{tc}$ equals $S_{tp}$.

42. The method according to claim 24, wherein $W_{rc}$ is equal to $W_{rp}$ and $W_{tc}$ equals $W_{tp}$.

43. The method according to claim 23, wherein the first orientation control window faces a center part of each first pixel electrode, the second orientation control window faces a center part of each second pixel electrode, the first opening faces a center part of the first common electrode and the second opening faces a center part of the second common electrode.

44. The method according to claim 21, wherein an insulating layer is formed on the first substrate before forming the reflective layer and a top surface of the insulating layer in the reflective region is higher than that in the transmissive region.

* * * * *